（12）United States Patent
Tam et al.

(10) Patent No.: US 7,488,772 B2
(45) Date of Patent: Feb. 10, 2009

(54) POLYMERIZATION OF MACROCYCLIC POLYESTER OLIGOMERS USING N-HETEROCYCLIC CARBENE AND METAL AMIDE OR METAL ALKOXIDE CATALYST

(75) Inventors: Wilson Tam, Boothwyn, PA (US); David T. Williamson, Hockessin, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 639 days.

(21) Appl. No.: 11/270,039

(22) Filed: Nov. 9, 2005

(65) Prior Publication Data

US 2006/0100362 A1 May 11, 2006

Related U.S. Application Data

(60) Provisional application No. 60/626,186, filed on Nov. 9, 2004.

(51) Int. Cl.
*C08K 3/02* (2006.01)
(52) U.S. Cl. .................. 524/701; 524/779; 524/789; 528/411; 528/416
(58) Field of Classification Search .............. 524/701, 524/779, 789; 528/411, 416
See application file for complete search history.

(56) References Cited

U.S. PATENT DOCUMENTS

| 3,462,395 | A | 8/1969 | Weiner |
| 5,039,783 | A | 8/1991 | Brunelle et al. |
| 5,214,158 | A | 5/1993 | Brunelle et al. |
| 5,231,161 | A | 7/1993 | Brunelle et al. |
| 5,321,117 | A | 6/1994 | Brunelle |
| 5,407,984 | A | 4/1995 | Brunelle et al. |
| 5,466,744 | A | 11/1995 | Evans et al. |
| 5,527,976 | A | 6/1996 | Takekoshi et al. |
| 5,668,186 | A | 9/1997 | Brunelle et al. |
| 2001/0049430 | A1 | 12/2001 | Winckler er al. |
| 2003/0195328 | A1 | 10/2003 | Wang et al. |

FOREIGN PATENT DOCUMENTS

| WO | WO02/068495 A1 | 9/2002 |
| WO | WO03/093491 A1 | 11/2003 |

OTHER PUBLICATIONS

GB 1,227,474 abstract (1971).*
Kamau et al., Polymers for Advanced Technologies, 2003, vol. 14, 492-501.
J. Am. Chem. Soc., 2002, vol. 124, pp. 914-915.
JACS Article, In Situ Generation of Carbenes . . . Polymerization, G. W. Nyce et al., pp. 3046-3056.
JACS Article, First Example of N-Heterocyclic Carbenes . . . Cyclic Esters, E. F.Conner et al., pp. 914-915.
Journal of Organometallic Chemistry, "Preparatin and Characterization . . . and its salt", P. B. Hitchcock et al., pp. 89-95.
Organic Letters, 2003, "Palladium-Catalyzed Intermolecular . . . Irradiation", G. Burton et al., pp. 4373-4376.
Helvetica Chemica Acta., VI, 79, Benzoin-Type coondinsations . . . Carbenes, J. H. Teles et al., pp. 61-83.

* cited by examiner

*Primary Examiner*—Edward J Cain

(57) ABSTRACT

Mixtures or adducts of N-heterocyclic carbenes with metal amides or metal alkoxides are effective catalysts for the polymerization of macrocyclic polyester oligomers. The catalysts are stable at polymerization temperatures, and the polymerization is rapid, resulting in high monomer conversion, high molecular weight, and a mechanically sound material.

21 Claims, No Drawings

POLYMERIZATION OF MACROCYCLIC POLYESTER OLIGOMERS USING N-HETEROCYCLIC CARBENE AND METAL AMIDE OR METAL ALKOXIDE CATALYST

This application claims the benefit of U.S. Provisional Application No. 60/626,186, filed Nov. 9, 2004, which is incorporated in its entirety as a part hereof for all purposes.

TECHNICAL FIELD

This invention relates to the polymerization of macrocyclic polyester oligomers. More particularly, it relates to a genus of catalysts for such polymerizations that provide rapid polymerization with high monomer conversion, producing high molecular weight, mechanically sound polymer.

BACKGROUND

Linear thermoplastic polyesters such as poly(alkylene terephthalate) are generally known and commercially available where the alkylene typically has 2 to 8 carbon atoms. Linear polyesters have many valuable characteristics including strength, toughness, high gloss and solvent resistance. Linear polyesters are conventionally prepared by the reaction of a diol with a dicarboxylic acid or its functional derivative, typically a diacid halide or diester. Linear polyesters may be fabricated into articles of manufacture by a number of known techniques including extrusion, compression molding, and injection molding.

Recently, macrocyclic polyester oligomers were developed which have unique properties that make them attractive as matrices for engineering thermoplastic composites. The desirable properties stem from the fact that macrocyclic polyester oligomers exhibit low melt viscosity, allowing them easily to impregnate a dense fibrous preform followed by polymerization to polyesters. Furthermore, certain macrocyclic polyester oligomers melt and polymerize at temperatures well below the melting point of the resulting polymer. Upon melting and in the presence of an appropriate catalyst, polymerization and crystallization can occur virtually isothermally.

The preparation of macrocyclic poly(alkylene dicarboxylate) oligomers and their polymerization to linear polyesters is described in U.S. Pat. Nos. 5,039,783, 5,214,158, 5,231,161, 5,321,117, and 5,466,744; and is reviewed by D. J. Brunelle in *Cyclic Polymers*, Second Edition [J. A. Semlyn (ed.), (2000), Kluwer Academic Publishers (Netherlands), pp. 185-228]. The catalysts employed for such polymerization include various organotin compounds and titanate esters, usually in solution polymerization processes. Polymerization using these catalysts is particularly successful in the case of poly(1,4-butylene terephthalate) ("PBT") because of the low temperatures at which the polymerization can be carried out. However, catalyst performance is limited by sensitivity to impurities present in the macrocyclic polyester oligomers, particularly acidic impurities. Such catalysts also lack adequate thermal stability at the high temperatures required for some polyester polymerizations. This is particularly the case of poly(1,3-propylene terephthalate) ("PPT").

Kamau et al. (Polymers for Advanced Technologies, 2003, Vol. 14, pp. 492-501) used di-n-butyltin oxide to catalyze the ring-opening polymerization of a mixture of cyclic PPT oligomers at 300° C. under nitrogen for two hours. The linear polymer so produced had a viscosity average molecular weight of only 22,500. Use of a specially purified PPT dimer increased the viscosity average molecular weight only to 30,300. The long time required and low molecular weight, brittle materials produced indicate this is not a commercially viable process.

N-heterocyclic carbenes have been used to catalyze ring-opening polymerization of aliphatic polyesters and lactones. Connor et al. demonstrated the use of 1,3-bis-(2,4,6-trimethylphenyl)imidazol-2-ylidene to catalyze the ring-opening polymerization of L-lactide, ε-caprolactone, and β-butyrolactone. The polymerizations were carried out in tetrahydrofuran at room temperature in the presence of an alcohol initiator (J. Am. Chem. Soc., 2002, Vol. 124, pp. 914-915).

There thus remains a need for an effective and efficient high-temperature process for preparing linear polyesters from macrocyclic polyester oligomers.

SUMMARY

One embodiment of this invention is a process for preparing a thermoplastic polyester comprising contacting at least one macrocyclic polyester oligomer with a mixture or an adduct of components (a) and (b) as described below, wherein:

(a) includes any one or more members of the group of N-heterocyclic carbene-containing catalysts described by any of the Formulae I, II and/or III:

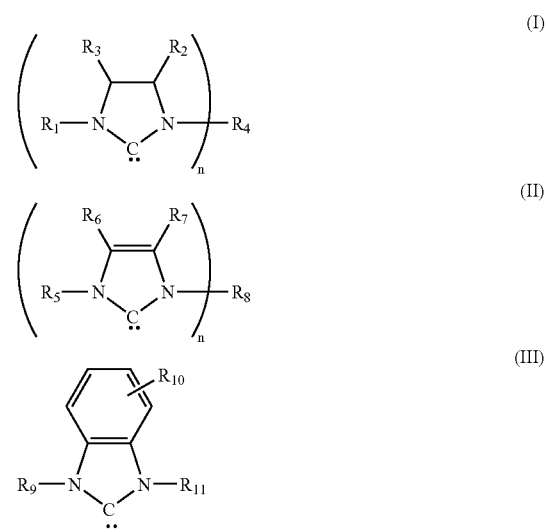

wherein:

$R_1$, $R_5$, $R_9$ and $R_{11}$ are each independently an adamantyl, alkaryl, or alkyl group;

$R_2$, $R_3$, $R_6$, $R_7$ and $R_{10}$ are each independently hydrogen or a $C_{1-12}$ alkyl group;

n=1 or 2;

$R_4$ is the same as $R_1$ when n=1, and is an alkylene group when n=2; and $R_8$ is the same as $R_5$ when n=1, and is an alkylene group when n=2; and (b) includes any one or more members of the group of compounds described by any of the Formulae IV, V, VI, VII and/or VIII:

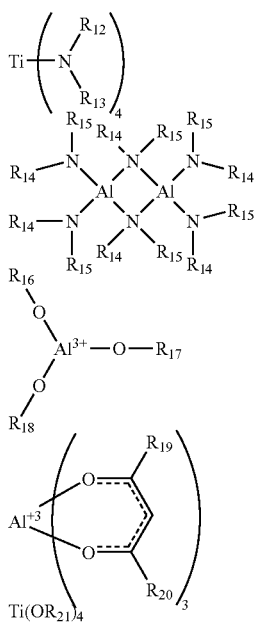

wherein $R_{12}, R_{13}, R_{14}$ and $R_{15}$ are each independently a $C_{1-12}$ aliphatic hydrocarbyl or substituted aliphatic hydrocarbyl group; and $R_{16}, R_{17}, R_{81}, R_{19}, R_{20}$ and $R_{21}$ are each independently a $C_{1-12}$ alkyl group.

In a further embodiment of this invention, articles are produced using a macrocyclic polyester oligomer material (with or without fillers) by polymerizing it in the process of forming the article, using processes including without limitation injection and rotational molding, resin film infusion, resin transfer molding, filament winding, powder coating to create a prepreg or film, hot melt prepreg preparation, compression molding, roll wrapping, and pultrusion; and all of these optionally with reinforcement.

DETAILED DESCRIPTION

In the context of this disclosure, a number of terms shall be utilized.

As used herein, the term "mixture" denotes a physical combining of at least two substances, which may or may not react with each other.

The term "adduct" as used herein refers specifically to a coordination compound XY formed from a compound X that donates an electron pair to a metal center in compound Y.

As used herein, the term "N-heterocyclic carbene" denotes a closed ring system containing at least one nitrogen ring atom and a ring atom that is a divalent carbon.

As used herein, the term "adamantyl" means the radical formed by the loss of a hydrogen atom from adamantane ($C_{10}H_{16}$). The 2-isomer is shown below:

As used herein, the term "mesityl" means the radical formed by the loss of a ring hydrogen from 1,3,5-trimethylbenzene, that is, 2,4,6, $-(CH_3)_3C_6H_2$

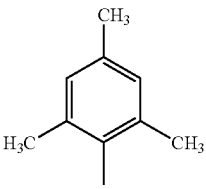

As used herein, a "macrocyclic" molecule means a cyclic molecule having at least one ring within its molecular structure that contains 8 or more atoms covalently connected to form the ring.

As used herein, an "oligomer" means a molecule that contains 2 or more identifiable structural repeat units of the same or different formula.

As used herein, a "macrocyclic polyester oligomer" means a macrocyclic oligomer containing 2 or more identifiable ester functional repeat units of the same or different formula. A macrocyclic polyester oligomer typically refers to multiple molecules of one specific formula having varying ring sizes. However, a macrocyclic polyester oligomer may also include multiple molecules of different formulae having varying numbers of the same or different structural repeat units. A macrocyclic polyester oligomer may be a co-oligoester or multi-oligoester, i.e., a polyester oligomer having two or more different structural repeat units having an ester functionality within one cyclic molecule.

As used herein, "an alkyl group" means a univalent group derived from an alkane by removing a hydrogen atom from any carbon atom: $-C_nH_{2n+1}$ where $n \geq 1$.

As used herein, "an aryl group" means a univalent group derived from a monocyclic or polycyclic aromatic compound by removal of a hydrogen atom from a ring carbon atom.

As used herein, "alkaryl" denotes an aryl group which bears at least one alkyl group. Examples are the mesityl group (i.e., 2,4,6-trimethylphenyl) and the 2,6-diisopropylphenyl group (i.e., the $(CH_3CHCH_3)_2C_6H_3$-radical).

As used herein, "an alkylene group" means $-C_nH_{2n}-$ where $n \geq 1$.

As used herein, "a cycloalkylene group" means a cyclic alkylene group, $-C_nH_{2n-x}-$, where x represents the number of H's replaced by cyclization(s).

As used herein, "a mono- or polyoxyalkylene group" means $[-(CH_2)_y-O-]_n-(CH_2)_y-$, wherein y is an integer greater than 1 and n is an integer greater than 0.

As used herein, "an alicyclic group" means a non-aromatic hydrocarbon group containing a cyclic structure therein.

As used herein, "a divalent aromatic group" means an aromatic group with links to other parts of the macrocyclic molecule. For example, a divalent aromatic group may include a meta- or para-linked monocyclic aromatic group As used herein, "a polyester polymer composite" means a polyester polymer that is associated with another substrate such as a fibrous or particulate material. Illustrative examples of particulate material are chopped fibers, glass microspheres, and crushed stone. Certain fillers and additives thus can be used to prepare polyester polymer composites. The term "fibrous material" or "fibrous substrate" means a more continuous substrate, e.g., fiberglass, ceramic fibers, carbon fibers or organic polymers such as aramid fibers.

As used herein, "wet-out" means a process to cause a physical state of good and sustained contact between a liquid substrate and a solid substrate such that no substantial amount of air or other gas is trapped between the liquid substrate and the solid substrate.

As used herein, "fiber" means any material with slender, elongated structure such as polymer or natural fibers. The material can be fiberglass, ceramic fibers, carbon fibers or organic polymers such as aramid fibers.

As used herein, a fiber "tow" or "strand" is a group of fibers together, or a bundle of fibers, which are usually wound onto spools and may or may not be twisted.

As used herein, a "fiber preform" is an assembly of fiber tows and/or fabric held together in a desired shape.

As used herein, a "prepreg" is a fiber material such as carbon, glass or other fiber, that has been impregnated with a resin material in sufficient volume as to provide the matrix of the composite, and such that the ratio of fiber to resin is closely controlled. The fiber configuration can be in tow form, woven or knitted into a fabric, or in a unidirectional tape.

It has been found that mixtures or adducts of compounds containing N-heterocyclic carbene with metal amides or metal alkoxides effectively catalyze the ring-opening polymerization of macrocyclic polyester oligomers. Such catalysts are stable at the temperatures required for polymerization and result in high monomer conversion, high molecular weight, and a mechanically sound material. The polymerization is rapid, with near-quantitative conversion typically in five to sixty minutes. Macrocyclic polyester oligomers that may be employed in this invention include, but are not limited to, macrocyclic poly(alkylene dicarboxylate) oligomers having a structural repeat unit of the formula:

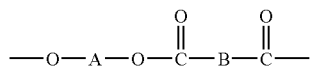

wherein A is an alkylene group containing at least two carbon atoms, a cycloalkylene, or a mono- or polyoxyalkylene group; and B is a divalent aromatic or alicyclic group.

Preferred macrocyclic polyester oligomers are macrocyclic polyester oligomers of 1,4-butylene terephthalate (CBT); 1,3-propylene terephthalate (CPT); 1,4-cyclohexylenedimethylene terephthalate (CCT); ethylene terephthalate (CET); 1,2-ethylene 2,6-naphthalenedicarboxylate (CEN); the cyclic ester dimer of terephthalic acid and diethylene glycol (CPEOT); and macrocyclic co-oligoesters comprising two or more of the above structural repeat units.

Synthesis of the macrocyclic polyester oligomers may be achieved by contacting at least one diol of the formula HO-A-OH with at least one diacid chloride of the formula:

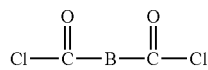

where A and B are as defined above. The reaction typically is conducted in the presence of at least one amine that has substantially no steric hindrance around the basic nitrogen atom. See, e.g., U.S. Pat. No. 5,039,783.

Another method for preparing macrocyclic polyester oligomers is by reacting at least one diester of B with at least one diol of the formula HO-A-OH, using an N-heterocyclic carbene catalyst as described in co-pending U.S. Provisional application No. 60/626,187 (which is incorporated in its entirety as a part hereof for all purposes), where A and B are as defined above. This leads to a mixture containing appreciable amounts of macrocyclic polyester oligomer.

Macrocyclic polyester oligomers also can be prepared via the condensation of a diacid chloride with at least one bis (hydroxyalkyl) ester such as bis(4-hydroxybutyl) terephthalate in the presence of a highly unhindered amine or a mixture thereof with at least one other tertiary amine such as triethylamine. The condensation reaction is conducted in a substantially inert organic solvent such as methylene chloride, chlorobenzene, or a mixture thereof. See, e.g., U.S. Pat. No. 5,231,161.

A recent paper [A. Lavalette, et al., Biomacromolecules, vol. 3, p. 225-228 (2002)] describes a process whereby an enzymatically catalyzed reaction of dimethyl terephthalate and di(ethylene glycol) or bis(2-hydroxyethyl)thioether leads to essentially complete formation of the dimeric cyclic ester, while use of 1,5-pentanediol leads to a relatively high yield of the dimeric cyclic ester, along with some linear polyester.

Macrocyclic polyester oligomers also can be prepared from linear polyester oligomers in a solvent using an enzyme catalyst, such as a lipase, protease, or esterase (PCT Patent Application WO 2003/093491 to Brugel and Di Cosimo).

Another method for preparing macrocyclic polyester oligomers or macrocyclic co-oligoesters is the depolymerization of linear polyester polymers in the presence of an organotin or titanate compound. In this method, linear polyesters are converted to macrocyclic polyester oligomers by heating a mixture of linear polyesters, an organic solvent, and a transesterification catalyst such as a tin or titanium compound. The solvents used, such as o-xylene and o-dichlorobenzene, usually are substantially free of oxygen and water. See, e.g., U.S. Pat. Nos. 5,407,984 and 5,668,186.

Macrocyclic polyester oligomers can be obtained through extraction from linear polyester. For example, Brugel in PCT Patent Application WO 2002/068496 teaches a continuous reactive extraction process, using a fluid such as an n-alkane or a perfluorocompound to extract macrocyclic ester oligomers from molten linear polyester. Macrocyclic polyester oligomers can also be obtained through extraction from low-molecular weight linear polyester. For example, CPT can be isolated from linear PPT oligomers by glycol extraction. The linear PPT oligomers are conveniently obtained during the manufacture of PPT, as they collect on bag filters during the finishing step in the manufacturing process.

It is also within the scope of the invention to employ macrocyclic co-oligoesters, or a mixture of at least two different macrocyclic oligoesters, to produce copolyesters. Therefore, unless otherwise stated, an embodiment of a composition, article or process that refers to macrocyclic polyester oligomers also includes embodiments utilizing macrocyclic co-oligoesters and embodiments utilizing a mixture of at least two different macrocyclic oligoesters.

In one embodiment of the present invention, component (a), the N-heterocyclic carbene-containing catalyst is a compound of the formula

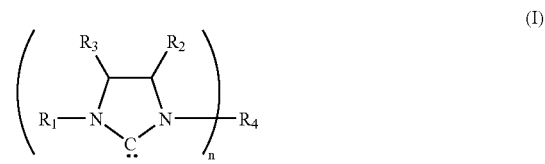

(I)

wherein:

$R_1$ is an adamantyl, alkaryl, or alkyl group;
$R_2$ and $R_3$ are independently hydrogen or a $C_{1-12}$ alkyl group;
n equals 1 or 2; and $R_4$ equals $R_1$ when n equals 1, and is an alkylene group when n equals 2.

Preferred are compounds in which $R_1$ is adamantyl or mesityl, $R_2$ and $R_3$ are hydrogen, and $R_4=R_1$. Some illustrative examples are:

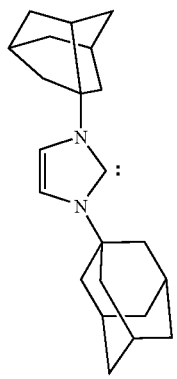

1,3-bis(1-adamantyl)-4,5-dihydroimidazol-2-ylidene

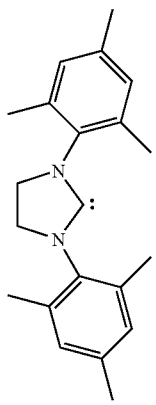

1,3-bis(2,4,6-trimethylphenyl)-4,5-dihydroimidazol-2-ylidene and

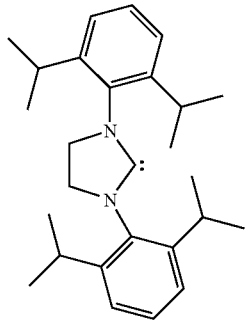

1,3-bis(2,6-diisopropylpheny)-4,5dihydroimidazol-2-ylidene

In another embodiment of the present invention, the N-heterocyclic carbene-containing catalyst is a compound of the formula

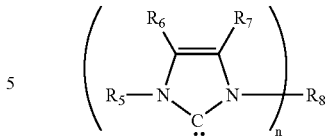

wherein
$R_5$ is an adamantyl, alkaryl, or alkyl group;
$R_6$ and $R_7$ are each independently hydrogen or a $C_{1-12}$ alkyl group;
n equals 1 or 2; and
$R_8$ equals $R_5$ when n equals 1, and is an alkylene group when n equals 2.

Preferred are compounds in which $R_5$ is adamantyl or mesityl, $R_6$ and $R_7$ are hydrogen, and $R_8=R_5$.

Non-limiting examples of compounds of Formula II are

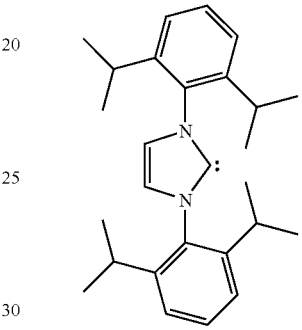

1,3-bis(2,6-diisopropylpheny)imidazol-2-ylidene

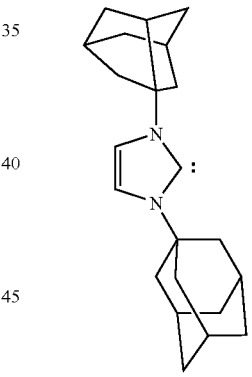

1,3-di-1-adamantyl-imidazole-2-ylidene and

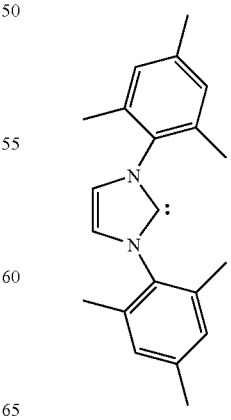

1,3-bis(2,4,6-trimethylphenyl)imidazol-2-ylidene

In yet another embodiment of the present invention, the N-heterocyclic carbene-containing catalyst is a compound of the formula

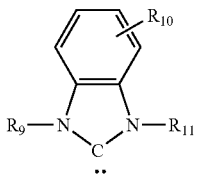
(III)

wherein $R_9$ and $R_{11}$ are each independently an adamantyl, alkaryl, or alkyl group, and $R_{10}$ is hydrogen or a $C_{1-12}$ alkyl group.

Preferred are compounds in which $R_9=R_{11}=$adamantyl or mesityl, and $R_{10}$ is hydrogen.

Carbenes specified by Formula III are described in Cetinkaya, E.; Hitchcock, P. B.; Kuecuekbay, H.; Lappert, M. F.; Al-Juaid, S.; J. Organometallic Chemistry (1994), 481, 89-95; and in Teles, J. H.; Melder, J.-P.; Ebel, K.; Schneider, R.; Gehrer, E.; Harder, W.; Brode, S.; Enders, D.; Breuer, K.; Raabe, G.; Helvetica Chimica Acta (1996), 79(1), 61-83.

In one embodiment of the present invention, component (b) of the catalyst mixture or adduct is a compound described by the formula

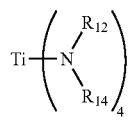
(IV)

wherein $R_{12}$ and $R_{13}$ are each independently a $C_{1-12}$ aliphatic hydrocarbyl or substituted aliphatic hydrocarbyl group. Preferred compounds are those wherein $R_{12}=R_{13}=$methyl or ethyl.

In another embodiment of the present invention, component (b) of the catalyst mixture or adduct is a compound described by the formula

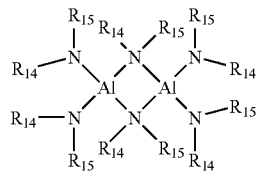
(V)

wherein $R_{14}$ and $R_{15}$ are each independently a $C_{1-12}$ aliphatic hydrocarbyl or substituted aliphatic hydrocarbyl group. Preferred compounds are those wherein $R_{14}=R_{15}=$methyl or ethyl.

In another embodiment of the present invention, component (b) of the catalyst mixture or adduct is a compound described by the formula

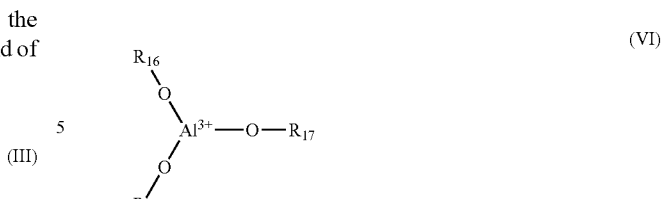
(VI)

wherein $R_{16}$, $R_{17}$ and $R_{18}$ are each independently a $C_{1-12}$ alkyl group. Typically, $R_{16}=R_{17}=R_{18}$. An example is the case where $R_{16}=R_{17}=R_{18}=$isopropyl.

In another embodiment of the present invention, component (b) of the catalyst mixture or adduct is a compound described by the formula

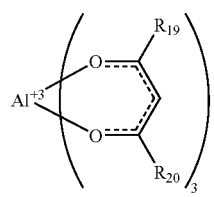
(VII)

wherein $R_{19}$ and $R_{20}$ are each independently a $C_{1-12}$ alkyl group. Typically, $R_{19}=R_{20}$. One such example is aluminum acetylacetonate, in which $R_{19}=R_{20}=$methyl.

In another embodiment of the present invention, component (b) of the catalyst mixture or adduct is a compound described by the formula $$Ti(OR_{21})_4 \quad (VIII)$$

wherein $R_{21}$ is a $C_{1-12}$ alkyl group. Two suitable examples of a compound of Formula VIII are titanium isopropoxide (CAS number 546-68-9), wherein $R_{21}$ is an isopropyl group; and tetrabutyl titanate (CAS 55-93-70-4}, wherein $R_{21}$ is an n-butyl group.

The polymerization reaction is carried out at an elevated temperature, typically in the range of about 180 to about 280° C., by heating to a temperature at which polymerization occurs. Typically, the macrocyclic polyester oligomer is heated to above its melting point so it becomes less viscous and can be manipulated more easily in processing. Stirring may be employed under an inert atmosphere.

The polymerization reaction may be carried out with or without a solvent. A solvent may be used to dissolve one or more of the reactants and/or to mix the reactants. A solvent may also be used as a medium in which the reaction is carried out. Illustrative solvents include high-boiling compounds such as o-dichlorobenzene and meta-terphenyl. In a preferred embodiment, no solvent is used in the polymerization reaction.

The total amount of catalyst used is typically in the range of 500 to 10,000 ppm by weight of the mixture formed with the macrocyclic polyester oligomer that is polymerized in contact with the catalyst. The ratio of component (a) to component (b) is preferably about 1:1 but can vary from about 1:4 to about 10:1.

The components (a) and (b) may be added to the reaction vessel individually, as a physical mixture (as powders for example), or as a separately produced adduct. As an example of the latter, 1,3-di-1-adamantyl-imidazole-2-ylidene and aluminum isopropoxide were heated together in toluene until a clear solution resulted. NMR evidence indicated an adduct, 1,3-di-1-adamantyl-imidazole-2-ylidene-tris-(isopropoxide) aluminum, had formed, which could then be used as a catalyst for a ring-opening polymerization reaction.

In one aspect of the invention, articles are produced using a macrocyclic polyester oligomer material (with or without fillers) by polymerizing it in the process of forming the article, using processes including, without limitation, injection and rotational molding, resin film infusion, resin transfer molding, filament winding, powder coating to create a prepreg or film, hot melt prepreg preparation, compression molding, roll wrapping, and pultrusion; and all of these optionally with reinforcement. The only proviso is that conditions allow for the polymerization of the macrocyclic polyester oligomer to form high molecular weight polyester; that is, the macrocyclic polyester oligomer should be heated at least to its melting point. Generally, most of such processes require that the resin to be processed have a low melt viscosity; therefore, macrocyclic polyester oligomers, which have low melt viscosity, viscosity are particularly suitable for such processing (see, e.g., U.S. Pat. No. 6,369,157).

For example, a molding process for manufacturing articles from macrocyclic polyester oligomer includes placing in a mold at least one macrocyclic polyester oligomer and a mixture or adduct of at least one catalyst described by any of the formulas I, II or III, and at least one catalyst described by any of the formulas IV, V, VI, VII or VIII, and heating the contents of the mold to a temperature high enough for polymerization of the oligomer to take place. This is above the melting point of the oligomer, typically in the range of about 180 to about 280° C. Molten oligomer and catalyst can be injected into the mold at much lower pressure than the 5,000 to 20,000 psi typical of injection molding processes because of the low viscosity of the molten oligomer.

In compression molding, the oligomer(s) and catalyst(s) are placed between a top die and a lower die within a press. The oligomer(s) and catalyst(s) are typically loaded onto a fibrous base material. The dies of the mold are pressed together with enough pressure to evenly fill the mold, and the mold contents are heated to a high enough temperature for polymerization to take place. Compression molding is used for making plastic composite parts that are thin and generally flat with mild features and contours such as truck and auto body panels, bumper beams, various trays and machine housings.

In rotational molding, the molding process additionally comprises rotating the mold about two axes simultaneously, so that the contents roll over the intended areas of the inside of the mold, beginning the rotation before the contents are heated, and continuing to rotate the mold until the content polymerizes and solidifies. Rotational molding is a process for making hollow thermoplastic articles, such as a wide variety of fluid storage tanks, tractor fenders and large children's toys.

In resin film infusion, a layer or film of the macrocyclic polyester oligomer(s) containing the catalyst(s) is placed in the mold adjacent to a dry layer of fibrous material, and, when the contents of the mold are heated, the oligomer(s) and catalyst(s) are forced to infuse into the dry layer of fibrous material. Resin film infusion is a process for making plastic composite articles that are predominantly flat on one face and may have detailed features. An illustrative example of such articles is aircraft wing skins which are typically constructed of a composite made with carbon fiber and epoxy resin.

The compositions and methods of the invention may be used to manufacture articles of various size and shape from various macrocyclic polyester oligomers. Exemplary articles that may be manufactured by the invention include without limitation automotive body panels and chassis components, bumper beams, aircraft wing skins, windmill blades, fluid storage tanks, tractor fenders, tennis rackets, golf shafts, windsurfing masts, toys, rods, tubes, bars stock, bicycle forks, and machine housings.

In the manufacture of an article, one or more of various types of fillers may be included. A particular filler often is included to achieve a desired purpose or property, and may be present in the resulting polyester polymer. For example, the purpose of the filler may be to increase the strength of the polyester polymer product. Boron nitride is used as a filler in applications that require high levels of heat conductivity and low levels of electrical conductivity. A filler also may provide weight or bulk to achieve a particular density, be a substitute for a more expensive material, and/or provide other desirable properties as recognized by a skilled artisan.

Illustrative examples of fillers are, among others, fumed silica, titanium dioxide, calcium carbonate, chopped fibers, fly ash, glass microspheres, micro-balloons, crushed stone, nanoclay, linear polymers, and monomers. A filler may be added before, during or after the polymerization reaction. The filler is added generally between about 0.1% and 70% by weight of the total polymerizable mixture (i.e., oligomer plus catalyst plus filler plus any other additives that may be present), depending on the filler and the purpose for adding the filler. For example, the percentage is preferably between 25% and 50% by weight in the case of calcium carbonate, between 2% and 5% by weight in the case of nanoclays, and between 25% and 70% by weight in the case of glass microspheres. Fillers can be used to prepare polyester polymer composites.

Furthermore, in the manufacture of an article, additional components (e.g., additives) may be added. Illustrative additives include colorants, pigments, magnetic materials, antioxidants, UV stabilizers, plasticizers, flame retardants, lubricants, and mold releases.

Where a range of numerical values is recited herein, unless otherwise stated, the range is intended to include the endpoints thereof, and all integers and fractions within the range. It is not intended that the scope of the invention be limited to the specific values recited when defining a range.

EXAMPLES

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

The meaning of abbreviations is as follows: "min" means minute(s), "g" means gram(s), "mg" means milligram(s), "mmol" means millimole(s), "ml" means milliliter(s), "$M_n$" means number average molecular weight, "$M_w$" means weight average molecular weight, "PDI" means polydispersity index and equals $M_w/M_n$, "DSC" means differential scanning calorimetry, "NMR" means nuclear magnetic resonance, and "GPC" means gel permeation chromatography.

Experimental

Materials.

Bis(μ-dimethylamino)tetrakis(dimethylamino) dialuminum ("Aluminum amide", CAS # 32093-39-3, 95%) and aluminum isopropoxide (CAS# 555-31-7, 98%) were obtained from Strem Chemicals, Inc. (Newburyport, Mass.) and were used as received. Titanium (IV) isopropoxide (CAS

546-68-9) was obtained from Aldrich Chemical Company (Milwaukee, Wis.) and was used as received.

CPT was isolated from poly(1,3-propylene terephthalate) via a warm glycol extraction from linear oligomers that were isolated on bag filters during the finishing step during the manufacture of poly(1,3-propylene terephthalate). CBT was isolated from poly(1,4-butylene terephthalate) as described in WO 2002/068496.

CPEOT was prepared as follows: A 22-L jacketed resin kettle equipped with overhead stirrer and Dean-Stark trap was charged with 9.246 L of toluene, 265.3 grams (2.50 mole) of diethylene glycol, and 485.5 g (2.50 mole) of dimethylterephthalate. The resulting mixture was heated to 80° C. with stirring until the dimethylterephthalate had dissolved, then 300 g of immobilized *Candida antartica* lipase B (Novozyme 435) was added. The resulting mixture was maintained at 80° C. while being sparged with nitrogen at 8.5 L/minute, and toluene lost due to sparging was replaced periodically. After 24 h, the nitrogen sparge was discontinued and the reaction mixture was discharged from the kettle at 80° C. Toluene was distilled from the product mixture at 70° C. and 50 mm vacuum, the resulting solids (1050 g) were divided into three equal portions, and each portion extracted with 1 1 L of refluxing chloroform for 3 h. The hot chloroform extract was filtered to remove the enzyme catalyst, and the resulting filtrate concentrated to about 3.5 L, cooled to room temperature, filtered, and the recovered white solid air-dried to produce a total of 490 g (83% yield, 99% purity) of 3,6,9,16,19,22-hexaoxatricyclo[22.2.2.211,14]triaconta-11,13,24,26,27,29-hexaene-2,10,15,23-tetrone, also known as "cyclic poly(diethyleneglycol terephthalate)" or CPEOT.

The N-heterocyclic carbenes were prepared as described in M. Niehues, G. Kehr, G. Erker, B. Wibbeling, R. Frohlich, O. Blacque, H. Berke, J. Organometallic Chem., 2002, Vol. 663, pp. 192-203; in W. A. Herrmann, C. Kocher, L. J. Goozen, and G. R. J. Artus, Chem. Eur.J. 1996, p. 1627; and in A. J. Arduengo, III, R. Krafczyk, R. Schmutzler, H. A. Craig, J. R. Goerlich, W. J. Marshall, M. Unverzagt, Tetrahedron, 1999, Vol. 55, pp. 14523-14534. 1,3-di-1-adamantyl-imidazole-2-ylidene-tris-(isopropoxide) aluminum was prepared by adding the carbene 1,3-di-1-adamantyl-imidazole-2-ylidene to aluminum isopropoxide in toluene and heating until a clear solution resulted. NMR indicated that an adduct of the two was formed.

Polymer Characterization.

A size exclusion chromatography system comprised of a Model Alliance $_{2690}$™ from Waters Corporation (Milford, Mass.), with a Waters $_{410}$™ refractive index detector (DRI) and Viscotek Corporation (Houston, Tex.) Model T-60A™ dual detector module incorporating static right angle light scattering and differential capillary viscometer detectors was used for molecular weight characterization. The mobile phase was 1,1,1,3,3,3-hexafluoro-2-propanol (HFIP) with 0.01 M sodium trifluoroacetate. The dn/dc was measured for the polymers and it was assumed that all of the sample was completely eluted during the measurement.

Example 1

Polymerization of cyclic poly(1,3-propylene terephthalate) Using 1,3-di-1-adamantyl-imidazole-2-ylidene-tris-(isopropoxide) aluminum Cyclic poly(1,3-propylene terephthalate) (5 g) was heated in a hot block to 265° C. until molten. 1,3-di-1-adamantyl-imidazole-2-ylidene-tris-(isopropoxide) aluminum (43 mg, 0.0751 mmol) was added to initiate the polymerization. The polymerization was allowed to proceed for 5 min and resulted in a hard semicrystalline polymer. GPC analysis indicated $M_n$=15200 and $M_w$=27600.

Comparative Example 1

Polymerization of Cyclic poly(1,3-propylene terephthalate) Using 1,3-di-1-adamantyl-imidazole-2-ylidene Cyclic poly(1,3-propylene terephthalate) (5 g) was heated in a hot block to 265° C. until molten. 1,3-di-1-adamantyl-imidazole-2-ylidene (26 mg, 0.0751 mmol) was added to initiate the polymerization. The polymerization was allowed to proceed for 5 min and resulted in a hard semicrystalline polymer. GPC analysis indicated $M_n$=6980 and $M_w$=11300.

Comparative Example 2

Polymerization of Cyclic poly(1,3-propylene terephthalate) Using Aluminum Isopropoxide Cyclic poly(1,3-propylene terephthalate) (5 g) was heated in a hot block to 265° C. until molten. Aluminum isopropoxide (17 mg, 0.0751 mmol) was added to initiate the polymerization. The polymerization was allowed to proceed for 5 min and resulted in a hard semicrystalline polymer. GPC analysis indicated $M_n$=8610 and $M_w$=15800.

Together, Example 1 and Comparative Examples 1 and 2 demonstrate that, under identical conditions, while the N-heterocyclic carbene and metal alkoxide each individually can catalyze the ring-opening polymerization, the metal alkoxide-carbene adduct is more effective that either one singly.

Example 2

Polymerization of CPEOT Using 1,3-di-1-adamantyl-imidazole-2-ylidene and Ti (IV) isopropoxide A mixture was prepared from 45 mg of 1,3-di-1-adamantyl-imidazole-2-ylidene, 35 mg of Ti (IV) isopropoxide and 1 ml of toluene as a solvent. The solvent was removed by vacuum and to the residue was added 0.943 g of CPEOT. The mixture was placed in a 230° C. hot block for 15 minutes. GPC analysis indicated Mn=4,210, Mw=7,750 with conversion of 64%.

Example 3

Polymerization of CPT in the Presence of Boron Nitride Using 1,3-di-1-adamantyl-imidazole-2-ylidene-tris-(isopropoxide) aluminum CPT (5 g) and boron nitride (1.5 g) were heated together in a hot block to 265° C. until molten. 1,3-di-1-adamantyl-imidazole-2-ylidene-tris-(isopropoxide) aluminum (43 mg, 0.0751 mmol) was added to initiate the polymerization. The polymerization was allowed to proceed for 5 min and resulted in a hard semicrystalline polymer with $M_n$=6030 and PDI=1.94

Example 4

Polymerization of CPT Using 1,3-di-1-adamantyl-imidazole-2-ylidene and Aluminum Isopropoxide at a Ratio of 1,3-di-1-adamantyl-imidazole-2-ylidene to Aluminum Isopropoxide of 10:1.

CPT (6 g) was heated to 265° C. in a hot block until molten. 1,3-di-1-adamantyl-imidazole-2-ylidene (26 mg, 0.0751 mmol) and aluminum isopropoxide (1.7 mg, 0.00751 mmol) were added to the molten CPT to initiate the polymerization. The polymerization was allowed to proceed for 5 min and resulted in a hard semicrystalline polymer, with $M_n$=13100 and PDI=1.78

Example 5

5 g of a 1:1 molar ratio mixture of CPEOT and CPT, 0.0463 g (0.138 mmol) of 1,3-di-1-adamantyl-imidazole-2-ylidene, and 0.0282 g (0.138 mmol) of aluminum isopropoxide were heated together at 240° C. for 1 hr. GPC analysis indicated $M_n$=12700 and $M_w$=23900, with 95.4% conversion.

What is claimed is:

1. A process for preparing a thermoplastic polyester comprising contacting at least one macrocyclic polyester oligomer with a mixture or an adduct of components (a) and (b) as described below:
    (a) any one or more of the N-heterocyclic carbene-containing catalysts described by any of the Formulae I, II and/or III:

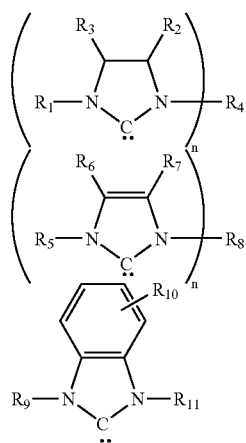

wherein:
    $R_1$, $R_5$, $R_9$ and $R_{11}$ are each independently an adamantyl, alkaryl, or alkyl group;
    $R_2$, $R_3$, $R_6$, $R_7$ and $R_{10}$ are each independently hydrogen or a $C_{1-12}$ alkyl group;
    n=1 or 2;
    $R_4$ is the same as $R_1$ when n=1, and is an alkylene group when n=2;
    $R_8$ is the same as $R_5$ when n=1, and is an alkylene group when n=2; and
    $R_{10}$ is hydrogen or a $C_{1-12}$ alkyl group; and
    (b) any one or more of the compounds described by any of the Formulae IV, V, VI, VII and/or VIII:

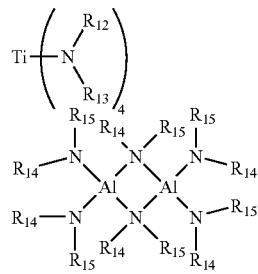

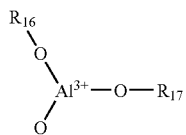

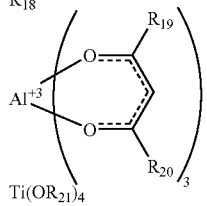

wherein
    $R_{12}$, $R_{13}$, $R_{14}$ and $R_{15}$ are each independently a $C_{1-12}$ aliphatic hydrocarbyl or substituted aliphatic hydrocarbyl group, and
    $R_{16}$, $R_{17}$, $R_{18}$, $R_{19}$, $R_{20}$ and $R_{21}$ are each independently a $C_{1-12}$ alkyl group.

2. The process of claim 1 which is carried out at a temperature of about 180 to about 280° C.

3. The process of claim 1 wherein the ratio of the weight of component (a) to the weight of component (b) is in the range of from about 1:4 to about 10:1.

4. The process of claim 1 wherein a macrocyclic polyester oligomer is contacted with a mixture or an adduct of components (a) and (b) in the presence of a filler.

5. The process of claim 4 wherein the weight of the filler is 0.1 to 70% of the total weight of oligomer plus catalyst plus filler plus any other additives present.

6. The process of claim 4 wherein the filler is at least one member of the group consisting of boron nitride, fumed silica, titanium dioxide, calcium carbonate, chopped fibers, fly ash, glass microspheres, micro-balloons, crushed stone, nanoclay, linear polymers, and monomers.

7. A process for manufacturing an article from macrocyclic polyester oligomer, comprising the steps:
    (a) providing to a mold at least one macrocyclic polyester oligomer and any one or more of the mixtures or adducts of components (a) and (b) as described in claim 1, and
    (b) heating the contents of the mold to a temperature at which polymerization of the oligomer occurs.

8. The process of claim 7 wherein the macrocyclic polyester oligomer is molten and is injected into the mold.

9. The process of claim 7 further comprising a step of rotating the mold about two axes simultaneously so that the contents roll over the intended areas of the inside of the mold, beginning the rotation before the contents are heated, and continuing to rotate the mold until the content polymerizes and solidifies.

10. The process of claim 7 wherein a layer or film of the macrocyclic polyester oligomer(s) comprising the catalyst(s) is placed in the mold adjacent to a dry layer of fibrous material, and, when the contents of the mold are heated, the oligomer(s) and catalyst(s) are forced to infuse into the dry layer of fibrous material.

11. The process of claim 7 wherein the mold contains a fibrous preform, and the macrocyclic polyester oligomer(s) and catalyst(s) are forced into the preform.

12. The process of claim 7 wherein the oligomer(s) and catalyst(s) are placed between a top die and a lower die within a press, and the dies of the mold are pressed together to evenly fill the mold with the oligomer(s) and catalyst(s).

13. A process for forming a prepreg from a macrocyclic polyester oligomer and a polymerization catalyst comprising the steps:
- (a-1) dissolving at least one macrocyclic polyester oligomer, and any one or more of the mixtures or adducts of components (a) and (b) as described in claim 1, in a solvent to form a solution thereof;
- (a-2) contacting the solution with a fibrous base material: and
- (a-3) removing the solvent; or
- (b-1) providing a release base material;
- (b-2) coating thereon a layer of at least one macrocyclic polyester oligomer and any one or more of the mixtures or adducts of components (a) and (b) as described in claim 1; and
- (b-3) pressing the release base material against a fibrous base material under heat; or
- (c-1) providing at least one macrocyclic polyester oligomer, and any one or more of the mixtures or adducts of components (a) and (b) as described in claim 1, as a powder;
- (c-2) impregnating a coating of the powder of step c-1 into a fibrous base material;
- (c-3) softening the oligomer; and
- (c-4) applying heat and pressure to cause the oligomer to flow and polymerizein the fibrous base material.

14. The process of claim 13 wherein the fibrous base material is a fabric, fiber tow, or unidirectional prepreg tape.

15. A pultrusion process for making a fiber reinforced article, comprising the steps:
- (a) providing at least one macrocyclic polyester oligomer and any one or more of the mixtures or adducts of components (a) and (b) as described in claim 1;
- (b) pulling a fibrous strand into an elongated die;
- (c) causing the macrocyclic polyester oligomer(s) and the catalyst(s) to contact with and around the fibrous strand in the die;
- (d) heating to cause polymerization of the macrocyclic polyester oligomer forming high molecular weight polyester resin matrix around the fibrous strand; and
- (e) pulling the polyester matrix into an exit portion of the die having a desired cross section thereby forming an article.

16. The process of claim 15 wherein the macrocyclic polyester oligomer is continuously melted outside the die and pumped into the die in liquid form.

17. A filament winding process for manufacturing hollow plastic composite articles from macrocyclic polyester oligomers, comprising the steps:
- (a) providing at least one macrocyclic polyester oligomer and any one or more of the mixtures or adducts of components (a) and (b) as described in claim 1;
- (b) contacting the macrocyclic polyester oligomer(s) and the polymerization catalyst(s) with a fibrous strand;
- (c) winding the fibrous strand onto a mandrel; and
- (d) heating the macrocyclic polyester oligomer to a temperature at which polymerization thereof occurs.

18. A roll wrapping process for manufacturing tubular articles from macrocyclic polyester oligomers, comprising the steps:
- (a) forming a prepreg by impregnating a sheet or tape of reinforcing fibers with at least one macrocyclic polyester oligomer and any one or more of the mixtures or adducts of components (a) and (b) as described in claim 1;
- (b) rolling the prepreg onto a mandrel; and
- (c) heating the macrocyclic polyester oligomer to a temperature at which polymerization thereof occurs.

19. The process of any of claims 7, 13, 15, 17 or 18 wherein at least one filler is present in contact with the macrocyclic polyester oligomer.

20. The process of claim 19 wherein the weight of the filler is 0.1 to 70% of the total weight of oligomer plus catalyst plus filler plus any other additives present.

21. The process of claim 19 wherein the filler is at least one member of the group consisting of boron nitride, fumed silica, titanium dioxide, calcium carbonate, chopped fibers, fly ash, glass microspheres, micro-balloons, crushed stone, nanoclay, linear polymers, and monomers.

* * * * *